US011158157B2

(12) United States Patent
Kato et al.

(10) Patent No.: US 11,158,157 B2
(45) **Date of Patent: *Oct. 26, 2021**

(54) GAMING SYSTEM AND METHOD FOR PROVIDING A ROULETTE GAME WITH VISUAL EFFECTS

(71) Applicant: ARUZE GAMING AMERICA, INC., Las Vegas, NV (US)

(72) Inventors: Yoichi Kato, Tokyo (JP); Katsuhiro Kido, Tokyo (JP)

(73) Assignee: ARUZE GAMING AMERICA, INC., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/735,281

(22) Filed: Jan. 6, 2020

(65) Prior Publication Data

US 2020/0143624 A1 May 7, 2020

Related U.S. Application Data

(63) Continuation of application No. 16/140,833, filed on Sep. 25, 2018, now Pat. No. 10,573,123.

(60) Provisional application No. 62/562,940, filed on Sep. 25, 2017.

(51) Int. Cl.

| | |
|---|---|
| ***G07F 17/00*** | (2006.01) |
| ***G07F 19/00*** | (2006.01) |
| ***A63F 13/00*** | (2014.01) |
| ***A63F 9/24*** | (2006.01) |
| ***G07F 17/32*** | (2006.01) |
| ***G07F 17/34*** | (2006.01) |

(52) U.S. Cl.

CPC ........ *G07F 17/322* (2013.01); *G07F 17/3213* (2013.01); *G07F 17/3288* (2013.01); *G07F 17/34* (2013.01); *G07F 17/3209* (2013.01)

(58) Field of Classification Search

CPC .. G07F 17/32; G07F 17/3202; G07F 17/3206; G07F 17/3209; G07F 17/3211; G07F 17/3213; G07F 17/3216; G07F 17/322; G07F 17/323; G07F 17/326; G07F 17/3288; A63F 5/00; A63F 5/0005; A63F 5/0076; A63F 5/0082

See application file for complete search history.

(56) References Cited

U.S. PATENT DOCUMENTS

| | | | | |
|---|---|---|---|---|
| 5,775,993 | A | 7/1998 | Fentz et al. | |
| 7,946,912 | B1 * | 5/2011 | Rennard ............ | G07F 17/3211 463/17 |
| 8,926,421 | B2 | 1/2015 | Arezina et al. | |
| 10,902,697 | B2 * | 1/2021 | Grubmueller, Jr. ... | G07F 17/323 |
| 2004/0002380 | A1 | 1/2004 | Brosnan et al. | |
| 2005/0014550 | A1 | 1/2005 | Rhoten | |

(Continued)

FOREIGN PATENT DOCUMENTS

| | | | |
|---|---|---|---|
| EP | 763374 | A1 | 3/1997 |
| WO | 2007024202 | A2 | 3/2007 |

OTHER PUBLICATIONS

United States Notice of Allowance dated Oct. 25, 2019 for U.S. Appl. No. 16/140,833.

*Primary Examiner* — Milap Shah

(74) *Attorney, Agent, or Firm* — EIP US LLP

(57) ABSTRACT

In one aspect, an improved roulette gaming system is disclosed herein, which provides visual effects for a roulette wheel, a roulette ball, or both.

20 Claims, 12 Drawing Sheets

(56) References Cited

U.S. PATENT DOCUMENTS

2005/0212210 A1 9/2005 Ogiwara
2006/0170154 A1 8/2006 Matsuno et al.
2007/0265057 A1 11/2007 Yoshizawa
2008/0096629 A1 4/2008 Yoshizawa
2008/0139280 A1 6/2008 Inamura
2008/0139281 A1 6/2008 Yoshizawa
2008/0211180 A1* 9/2008 Lutnick ............... G07F 17/3202 273/142 C
2008/0248866 A1* 10/2008 Cove ................... G07F 17/3211 463/25
2008/0265504 A1* 10/2008 Jones .................. G07F 17/3216 273/144 R
2009/0093300 A1* 4/2009 Lutnick ............... G07F 17/3244 463/26
2010/0009748 A1 1/2010 Timperley et al.
2010/0124966 A1 5/2010 Kido
2010/0130280 A1* 5/2010 Arezina .............. G07F 17/3206 463/20
2010/0279757 A1 11/2010 Glenn, II et al.
2010/0304827 A1 12/2010 Kido
2012/0115562 A1 5/2012 Kido et al.
2012/0115599 A1 5/2012 Conway et al.
2012/0172103 A1 7/2012 Gurule
2013/0040720 A1* 2/2013 Cammegh ................. A63F 5/00 463/17
2014/0098219 A1 4/2014 Berry, III et al.
2014/0370957 A1 12/2014 Hadida
2015/0321082 A1 11/2015 Kawabata
2016/0328913 A1* 11/2016 Blazevic ............... G07F 17/322
2016/0343196 A1 11/2016 Matsumura et al.
2016/0343200 A1 11/2016 Matsumura
2016/0343201 A1 11/2016 Kido et al.
2016/0344989 A1 11/2016 Izawa
2019/0244469 A1* 8/2019 Grubmueller, Jr. .......................... G07F 17/3213

* cited by examiner

SEC B-B

GAMING SYSTEM AND METHOD FOR PROVIDING A ROULETTE GAME WITH VISUAL EFFECTS

CROSS-REFERENCE TO RELATED APPLICATIONS

This application is a continuation application of U.S. application Ser. No. 16/140,833 filed Sep. 25, 2018, which claims priority to U.S. Provisional Application No. 62/562,940, filed Sep. 25, 2017 under 35 U.S.C. § 119(a). Each of the above-referenced patent applications is incorporated by reference in its entirety.

BACKGROUND OF THE INVENTION

Field of the Invention

The present disclosure relates to roulette systems. One example of such a roulette system may be an automated electronic roulette system, that comprises a physical roulette wheel and a physical roulette ball.

Description of the Related Technology

Roulette is a traditional casino game that finds its origin in the 18$^{th}$ century. Lately, roulette games have become automated, thereby removing the need for a human croupier. Roulette games are sometimes slow, as a complete game cycle can take well over a minute. However, traditional roulette games are limited by physics, with the launching of the roulette ball and the spinning of the wheel having constraints in order to retain the integrity of the game—launching a ball too slowly or slowing the spin of a roulette wheel too much in an effort to speed up the game play may deteriorate the underlying randomness of the game.

SUMMARY

The present disclosure teaches a roulette game with dynamic visual effects. In one embodiment, the visual effects rotate on the roulette wheel, in sync with the spin rate of the roulette wheel. In another embodiment, the visual effects are associated with the roulette ball as it rotates around the roulette wheel, with the visual effect moving at substantially the same rate as the roulette ball. In a further embodiment, the visual effects are provided to increase excitement for the player during the game. In still another embodiment, the visual effects are provided to convey game-pertinent information, such as a bonus period.

In a further embodiment, a roulette gaming system is provided which comprises a plurality of player stations, each configured to accept a physical item associated with a monetary wager, a game controller, and at least one memory device that stores a plurality of instructions. In such an embodiment, the game controller is configured to execute the instructions to receive a communication from at least one player station indicating a wager has been accepted for a play of a roulette game, cause a roulette wheel to spin, and cause a roulette ball to be launched. The game controller is further configured to cause a graphical processing unit to determine a first future location and a different second future location of the launched ball, determine a first future angle and a different second future angle of the spinning roulette wheel, cause a first visual effect to be displayed at a first position, the first position being based on the determined first future location of the launched ball, cause the first visual effect to be displayed at a second position, the second position being based on the determined second future location of the launched ball, cause a second visual effect to be displayed at a first orientation on the spinning roulette wheel, the first orientation being based on the determined first future angle, cause the second visual effect to be displayed at a second orientation on the spinning roulette wheel, the second orientation being based on the determined second future angle, and cause the first visual effect to cease being displayed prior to the roulette ball coming to rest in a pocket of the roulette wheel. The game controller is also configured to determine a game outcome from the play of the roulette game and communicate the game outcome to the at least one player station.

It is therefore an advantage of the present disclosure to provide a roulette gaming system that provides dynamic visual effects to increase excitement.

It is another advantage of the present disclosure to provide a roulette gaming system that provides dynamic visual effects to facilitate player communication.

It is still another advantage of the present disclosure to provide a roulette gaming system that provides dynamic visual effects to enable new game play features, such as bonus games.

It should be understood that various changes and modifications to the embodiments described herein will be apparent to those skilled in the art. Such changes and modifications can be made without departing from the spirit and scope of the present subject matter and without diminishing its intended advantages.

BRIEF DESCRIPTION OF THE DRAWINGS

Some implementations of the present disclosure are described with respect to the following figures.

Figure 1:
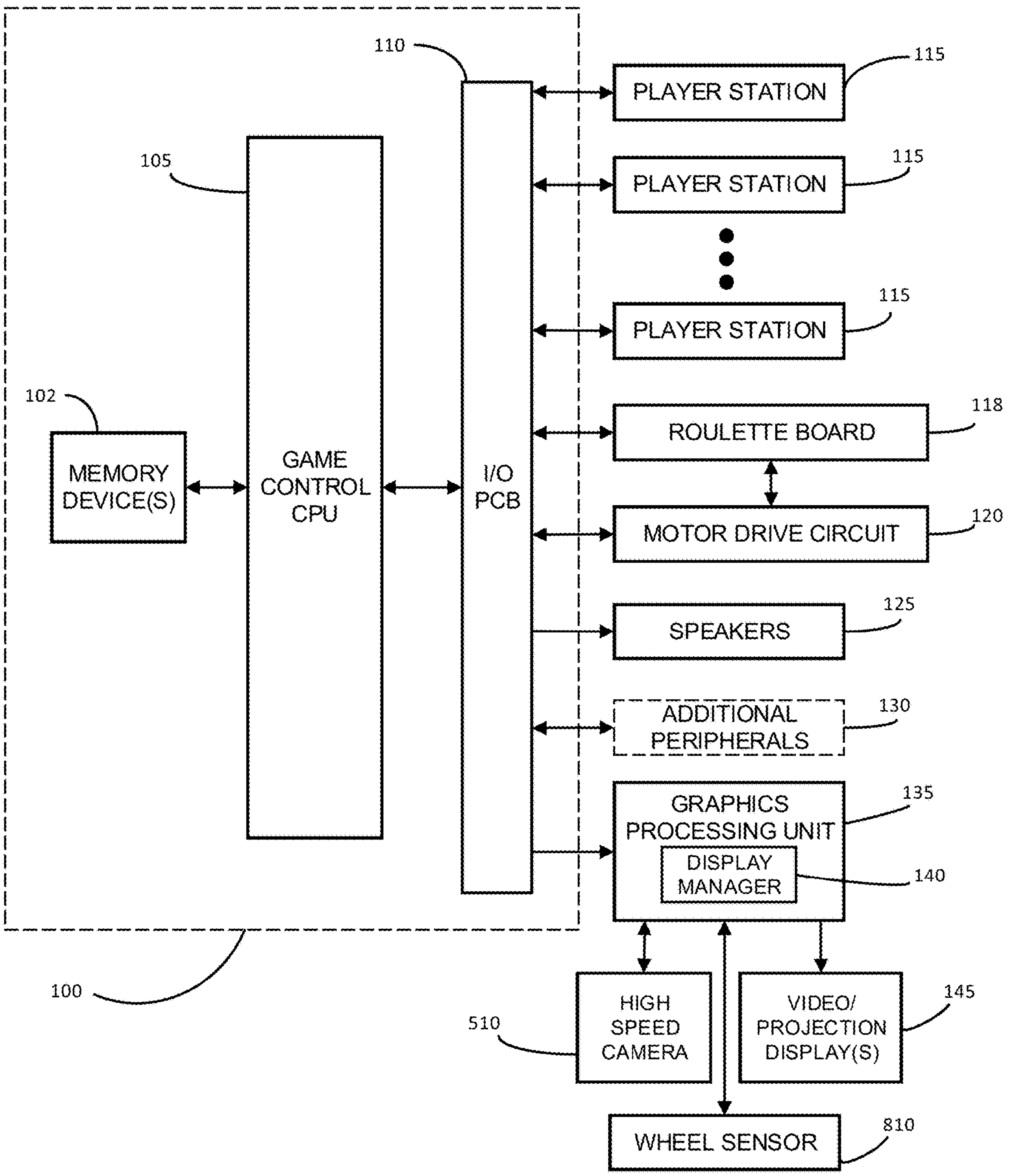
FIG. 1 is a schematic view of a roulette gaming system, according to one embodiment of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples consistent with the description; however, the description is not limited to the examples provided in the drawings.

DETAILED DESCRIPTION OF CERTAIN INVENTIVE EMBODIMENTS

Referring to FIG. 1, a schematic view of one embodiment of the roulette system is displayed. Arrowed lines are shown to generally illustrate the contemplated flow of communications between components.

It is contemplated that a roulette system may have at least one secure area 100 to house sensitive components. While FIG. 1 illustrates several components within secure area 100, it is contemplated that additional components could be located within secure area 100 or that additional secure areas could be associated with the roulette system. In FIG. 1, at least one game controller memory device 102 is in communication with a game control central processing unit (CPU) 105. Game Control CPU 105 can perform arithmetic and logical operations, and also extract instructions from game controller memory device(s) 102 and decodes and executes them. Game control CPU 105 may comprise at least one processor. Alternatively, it is contemplated that instead of game control CPU 105, an array processor or vector processor has multiple parallel computing elements, which utilizes a distributed computing model, to perform such arithmetic and logical operations. The game control CPU 105 may also be referred to as a game controller herein.

Game controller memory device(s) 102 can include one or more distinct types of memory devices, such as random access memory (RAM) or dynamic RAM (DRAM), which can include non-volatile RAM (NVRAM), magnetic RAM (MRAM), ferroelectric RAM (FeRAM) and other forms as commonly understood in the computing industry. In one embodiment, the game controller memory device(s) 102 includes read only memory (ROM), which may, for example, store regulatory-sensitive instructions for the roulette system. In one embodiment, the game controller memory device(s) 102 includes flash memory and/or EEPROM (electrically erasable programmable read only memory). Any other suitable magnetic, optical and/or semiconductor memory may operate in conjunction with the roulette system disclosed herein.

In some embodiments, game controller memory device(s) 102 store program code that is executable by Game Control CPU 105. Game controller memory device(s) 102 may also store operating data, such as a random number generator (RNG), game instructions, event data, display files, game history data, and other such data and instructions that allow for a gaming device to properly function in a regulated environment.

In the present example, Game Controller 105 is communicatively connected to at least one input/output device (I/O device) 110 which operates as an electrical interface between Game Control CPU 105 and access stations and various peripherals of the roulette system. The I/O device 110 can be or can include a printed circuit board (PCB) and/or one or more integrated circuits. FIG. 1 further illustrates communicating with a plurality of player stations 115. In one embodiment, player stations 115 are the primary mechanism for the placement and settlement of wagers on the roulette system. In another embodiment, at least one dealer station allows the dealer to manage the roulette game played at the roulette system, as discussed more below.

FIG. 1 also illustrates other contemplated peripherals, including speakers 125, and other additional peripherals 130. Also illustrated is a graphic processing unit (GPU) 135, which works in coordination with game control CPU 105 to control the video/projection display(s) 145 contemplated herein, and causes them to display various visual aspects associated with a play of a game. Graphics processing unit 135 is also displayed in this example with display manager 140, which in this example is a program module to help control the projection display system, as discussed below. High speed camera 510 is also in communication with graphics processing unit 135, and comprises part of the system that detects a roulette ball's location as it is rotating around a roulette wheel, as discussed in more detail below. Wheel sensor 810 may also be in communication with graphics processing unit 135, and comprises part of the system that detects a roulette wheels position, as discussed in more detail below.

FIG. 1 in the present embodiment illustrates further communication paths to roulette board 118 and motor drive circuit 120, which are in communication with each other as well. In this example, the roulette game system is an automated system, and the roulette board 118 is configured to manage the roulette game, including the spinning of a physical roulette wheel, controlling the launching of the roulette ball and determining the final number the ball lands on. It is contemplated that in one embodiment, the roulette wheel is a virtual roulette wheel, such as Aruze Gaming's VIRTUAL ROULETTE™ product. In another embodiment, the spinning of the roulette wheel and/or the launching of the roulette ball are managed by a human croupier. Also displayed are the communication paths from game control CPU 105, roulette board 118 and motor drive circuit 120, which is configured to spin the roulette wheel based on communications received over such communication paths.

Figure 2:
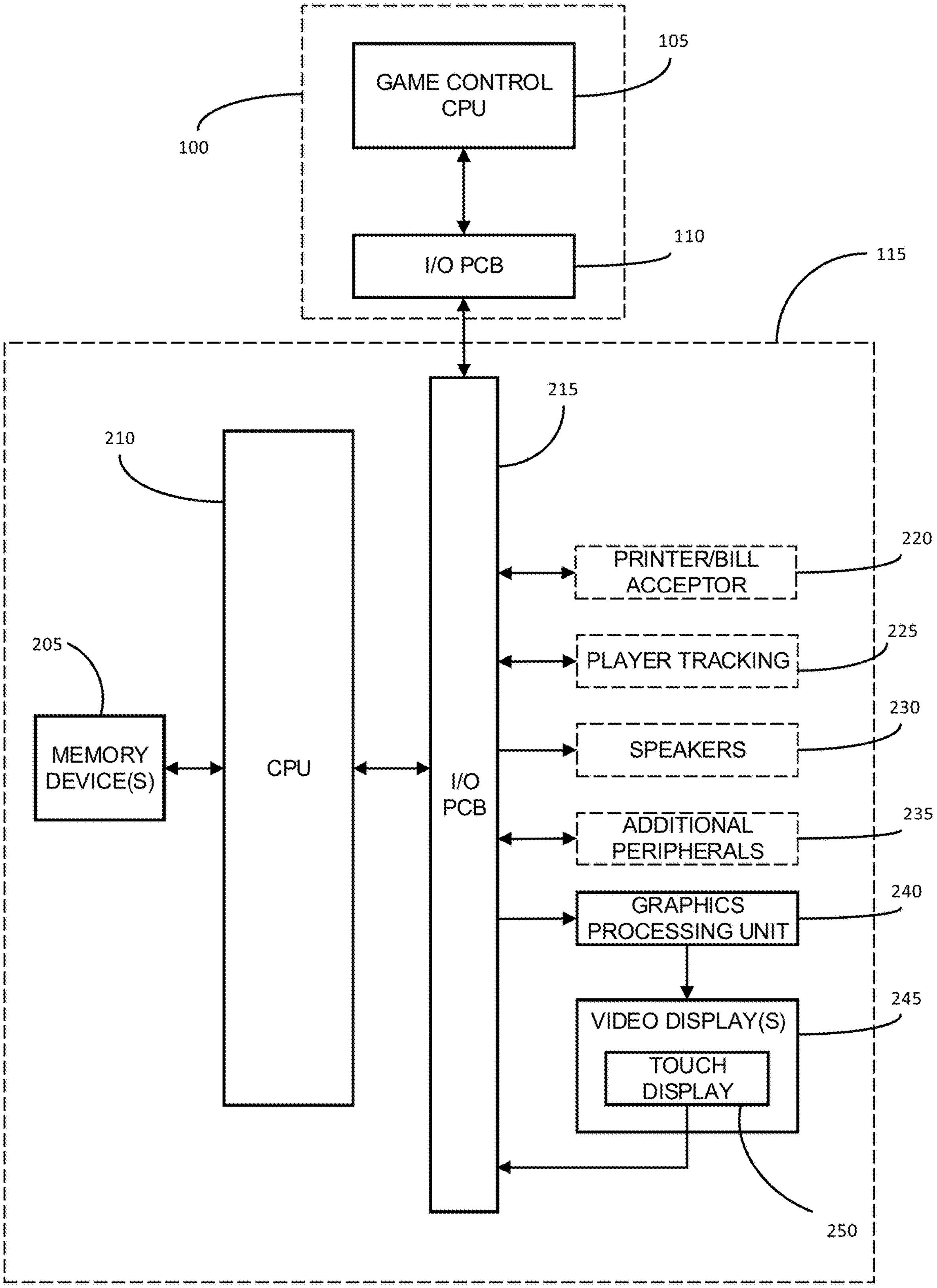
FIG. 2 is a schematic view of a player station, according to one embodiment of the present disclosure.

FIG. 2 is a schematic illustration of one contemplated embodiment of a player station 115. In this embodiment, at least one player station memory device 205 is in communication with a player station CPU 210. Player station CPU 210 can perform arithmetic and logical operations, and also extract instructions from player station memory device(s) 205 and decodes and executes them. Player station CPU may comprise at least one processor. Alternatively, it is contemplated that instead of player station CPU 210, an array processor or vector processor has multiple parallel computing elements, which utilizes a distributed computing model, to perform such arithmetic and logical operations.

Player station memory device(s) 205 can include one or more distinct types of memory devices, such as random access memory (RAM) or dynamic RAM (DRAM), which can include non-volatile RAM (NVRAM), magnetic RAM (MRAM), ferroelectric RAM (FeRAM) and other forms as commonly understood in the computing industry. In one embodiment, the game controller memory device(s) 102 includes read only memory (ROM), which may, for example, store regulatory-sensitive instructions for the roulette system. In one embodiment, the player station memory device(s) 205 includes flash memory and/or EEPROM (electrically erasable programmable read only memory). Any other suitable magnetic, optical and/or semiconductor memory may operate in conjunction with player station 115.

In this embodiment, player station CPU 210 is communicatively connected to at least one input/output device (I/O device) 215 which operates as an electrical interface between player station CPU 210 and the game control CPU 105 via the I/O PCB 110, and various peripherals of player station 115. The I/O device 215 can be or can include a printed circuit board (PCB) and/or one or more integrated circuits. FIG. 2 further illustrates communicating with a plurality peripherals, such as possibly a printer/bill acceptor 220. It is also contemplated that similar benefits could be derived from a system where the player station 115 does not include a printer/bill acceptor 220, but rather a dealer station does. In such an embodiment, a player could hand their money to the dealer/attendant, which could then cause the appropriate player station 115 to be credited with the proper amount of credits, which the player can then use to wager and play with. In this example, the printer/bill acceptor 220 is configured to accept tangible mediums of currency, such a physical/paper bills and tickets. In another embodiment, printer/bill acceptor 220 may be comprised of multiple components, such as a separate currency acceptor and printer. In such an embodiment, the currency acceptor may be a coin acceptor which accepts coins. In still another embodiment, player station 115 includes more than one currency acceptor, such as one for coins, one for paper bills, and/or one for tickets. In another embodiment, printer/bill acceptor 220 can accept multiple denominations of currency, or even currencies from multiple countries. In still another embodiment, printer/bill acceptor 220 can accept a ticket or similar physical indicium that is distributed by a casino or another gaming machine, which indicates an amount of currency available for use at player station 115. In a further embodiment, printer/bill acceptor 220 can accept credit cards, debit cards, prepaid cards, or other instruments to initiate an electronic funds transfer. It is also contemplated that instead of a printer/bill acceptor 220, the player station 115 provides another means to allow a player to access money in order to wager on a play of the game. For example, the player may enter a PIN in order to access an account they have, either with a bank or the casino itself, and upon entering the PIN and other information, certain amount of funds are transferred to the player station 115 or otherwise allowed to be wagered via player station 115. In another embodiment, printer/bill acceptor 220 is configured to interact with a radio frequency identification (RFID) or a Bluetooth device which can transmit financial information short distances, for example a bracelet, smart watch, smart phone, or other similar devices.

Printer/bill acceptor 220 is further configured to print out tickets which represent values of money that may be cashed in. It is common now that gaming machines and player station accept currency, but will only provide a ticket upon cashout, and then the holder of the ticket must take the ticket to the cashier's cage or a ticket redemption kiosk in order to obtain the currency indicated by the ticket. For player station 115, it is contemplated that after a player elects to cashout by selecting an appropriate input at touch display 250, printer/bill acceptor 220 prints out a ticket which indicates the amount of currency the player elected to cashout, and the player can then take the ticket and insert it into another gaming machine, or visit a cashier's cage or a ticket redemption kiosk to exchange the ticket for currency.

FIG. 2 also illustrates the contemplated inclusion of a player tracking peripheral 225. Currently, attendants at standard roulette tables typically estimate the amount of play by any particular player, and must then manually input such estimation into an associated player tracking manager system. However, such systems are hard to properly run and can lead to players having their play/wagers underreported or overreported, which are both detrimental to a casino's player tracking program. In the current embodiment, by allowing players to immediately associate their play with their player tracking account, for example by inserting their player tracking card into the player tracking peripheral 225, they are able to be accurately monitored. This could lead to both reduced costs for casinos, as they will only provide awards to players who actually meet their award criteria, and increased enjoyment by players, as their level of play will accurately be recorded, which could lead to increased awards.

In one embodiment, player tracking peripheral 225 includes an information display. It is contemplated that such an information display could be utilized to communicate with the player. It is contemplated that such an information display could be a liquid crystal display (LCD), a plasma display, an electroluminescent (EL) display, an organic light emitting diode (OLED) display, an LED dot matrix type of display, or could be any other type of display suitable for smaller displays. It is contemplated that player station 115 could include a visibly distinct player tracking peripheral 225, or a visually integrated player tracking device that utilizes a portion of a primary gaming display and possibly also an associated touchscreen in order to interact with a player. In practice, a player makes their identity known to the player tracking peripheral 225, either actively by inserting a player tracking card and/or entering a PIN into player tracking peripheral 225, or passively by utilizing a location device, such as a radio frequency identification (RFID) tag or a Bluetooth device which can transmit information short distances, for example a bracelet, smart watch, smart phone, or other similar devices. Thereafter, the player tracking peripheral 225 communicates over a network with a casino tracking system to track a player's play, and potentially offer awards or other services to the player, often through the same player tracking peripheral 225. The player tracking peripheral 225 can also display player status information back to the player, or other information based on or otherwise related to a player's play history and/or status, including awards earned by a player. It is also contemplated that the networked player tracking peripheral 225 can be utilized to offer other services to players, such as the ordering of drinks, or making promotional offers to a player, perhaps working in coordination with printer/bill acceptor 220 to do so.

FIG. 2 also illustrates other contemplated peripherals, including speakers 230, and other additional peripherals 235. Also illustrated is a graphic processing unit (GPU) 240, which works in coordination with player station CPU 210 to control the video display(s) 245 of the player station 115, and causes them to display various aspects of a graphical user interface (GUI) for the roulette system. It is further contemplated that the video display(s) 245 include the touch display 250, also referred to as a touchscreen, which is configured to receive various inputs from a player. As illustrated in FIG. 2, it is contemplated touch display 250 is configured to communicate back to player station CPU 210 via I/O device 215. In one embodiment, the touch display 250 would allow a player to touch portions of the screen in order to input selections or other commands. Use of such touchscreens are common on gaming machines.

Figure 3:
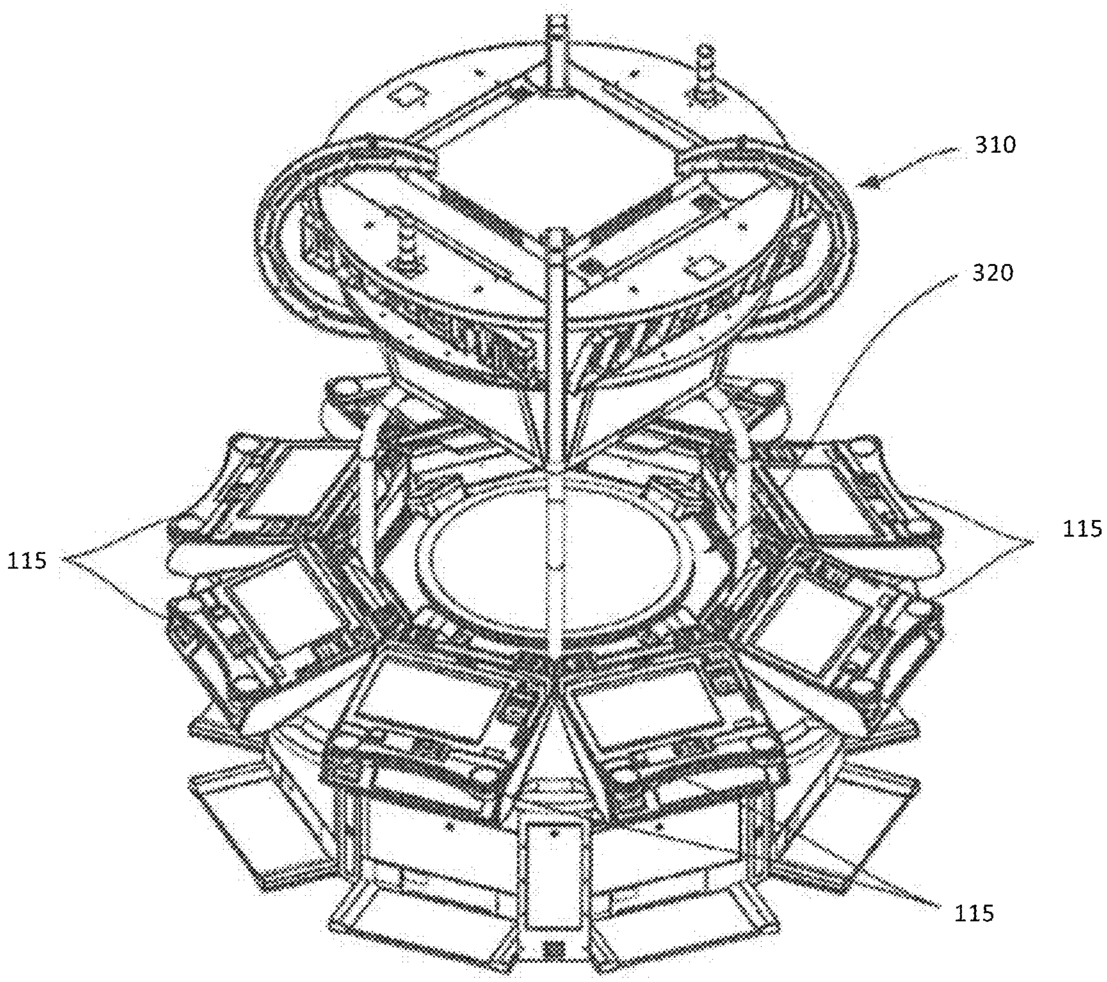
FIG. 3 is a general three-dimensional view of a roulette gaming system, according to one embodiment of the present disclosure.

FIG. 3 provides a general three-dimensional view of the roulette gaming system, as contemplated in one embodiment. In this example, a plurality of player stations 115 surround a roulette wheel assemblage shown generally at 320. FIG. 3 also generally illustrates projection assemblage 310, which is located above roulette wheel assemblage 320. As discussed previously, roulette wheel assemblage 320 could comprise an automated roulette wheel system, a virtual roulette wheel system, a standard roulette wheel system operated by a croupier, or a combination of one or more thereof.

Figure 4:
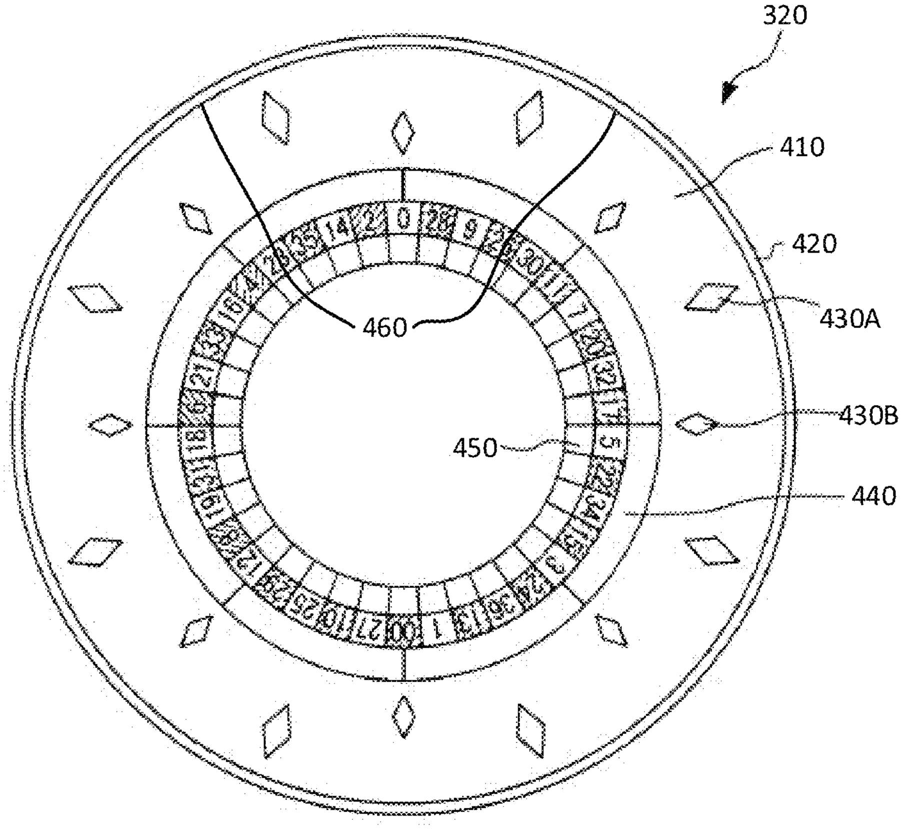
FIG. 4 is top view of a roulette wheel assemblage, according to one embodiment of the present disclosure.

FIG. 4 provides one example of a physical roulette wheel assemblage, shown generally at 320. In this example, roulette wheel assemblage 320 comprises an inclined face 410 and a surrounding bowl rim 420. Located on the inclined face 410 are various wheel pins 430A and 430B, which may have different sizes and/or shapes. Generally, wheel pins 430A and 430B may be diamond shaped. Roulette wheel assemblage 320 also includes a wheel 440, which typically spins relative to the inclined face 410. Wheel 440 also includes pockets 450 of various numbers and colors, as is typical in a roulette game. At or near where the inclined face 410 and bowl rim 420 meet lies ball track 460. In an exemplary play of roulette, wheel 440 is spun or is caused to spin, and a roulette ball is launched onto ball track 460 which provides a location for the roulette ball to make several rotations around a spinning wheel 440. Once the ball loses enough speed, it will then typically drop down from ball track 460, perhaps hit one or more wheel pins 430A & 430B, and roll onto wheel 440 and come to rest in a pocket 450, which indicates a winning number and color. It is contemplated that a roulette ball could be launched by a person, or by mechanical means, such as a spring or a compressed air system. It is also contemplated that the roulette system could be entirely automatic, partially automatic, or could be a traditional roulette system whereby a person both spins the wheel 440 and launches the ball. In the present example, roulette wheel assemblage does not have a center spindle or other obstruction. In one embodiment, providing a roulette wheel assemblage 320 without obstructions, such as a spindle, allows for a better medium to project displays onto. In this example, it is contemplated that removing such obstructions would reduce potential shadow effects that such a structure might cause.

Figure 5:
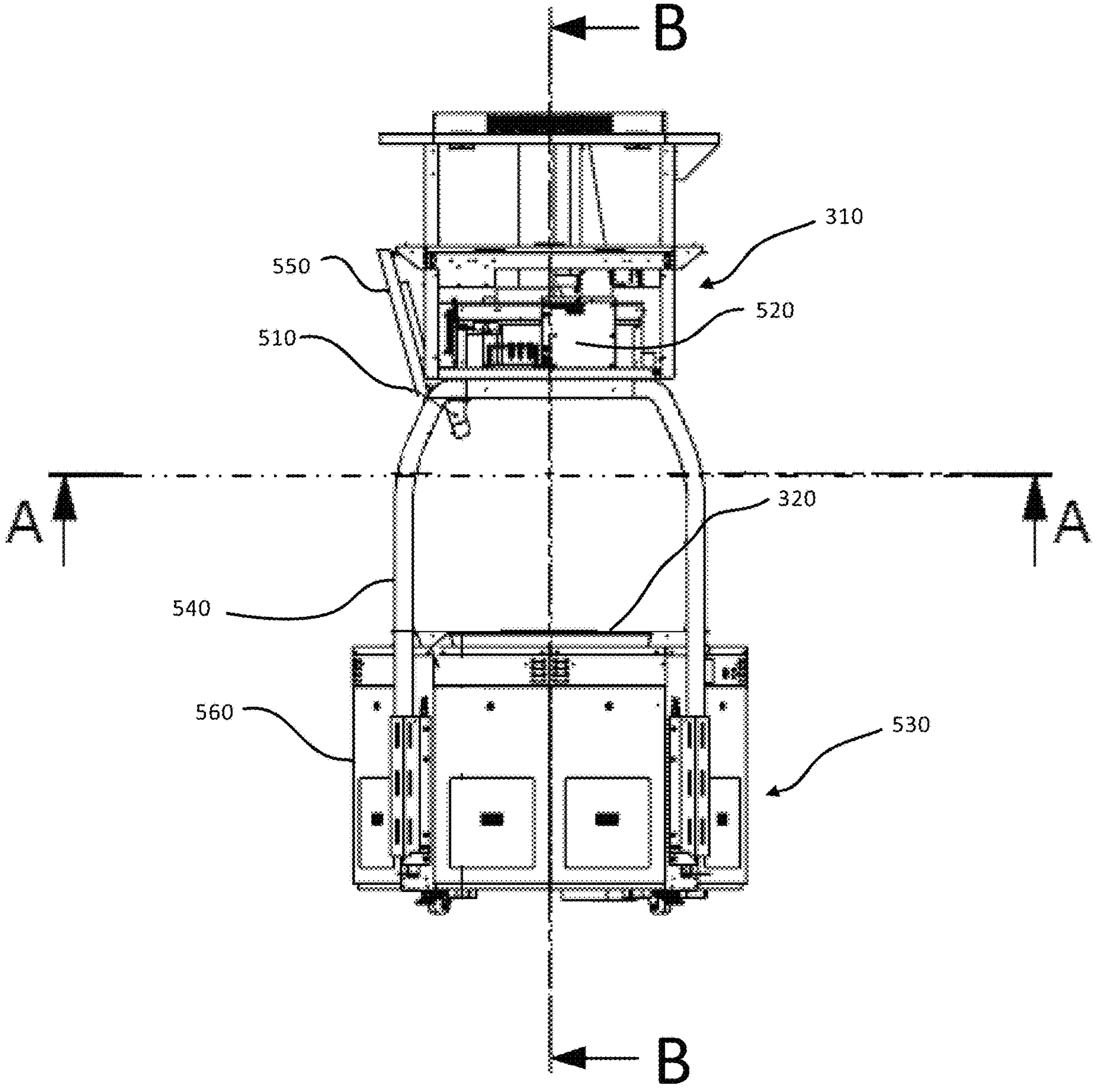
FIG. 5 is a side plan view of a roulette gaming system, according to one embodiment of the present disclosure.

FIG. 5 is a side plan view of a roulette system, with player stations removed for illustration purposes, in accordance with one embodiment. FIG. 5 also indicates Sectional Lines A-A and B-B which correspond to FIGS. 6 and 7, respectively. The roulette system illustrated in FIG. 5 includes projection assemblage 310 and roulette wheel assemblage 320. In the present example, projection assemblage 310 is located above roulette wheel assemblage 320 so that it can position projector 520 above roulette wheel assemblage 320 in order to facilitate the displaying of graphics and visual effects onto the playing surface. Such visual effects may include the roulette wheel itself, overlaying visual effects onto a physical roulette wheel, the roulette ball itself, visual effects associated with the physical ball, dynamic visual effects, static visual effects, and combinations thereof and discussed in more detail below.

Projector 520 may be any commercially available digital projector, including but not limited to, a liquid crystal display (LCD) projector, a digital light processing (DLP) projector, a liquid crystal on silicon (LCoS) projector, a multi-LCD laser light source projector, or any other digital projector offering good resolution.

Projector assemblage 310 is further illustrated as supporting game signage 550, which may be flat-panel video displays, static signage, light-emitting diodes (LED) signage, or any other signage that an operator may desire. Projector assemblage 310 is supported by an overhead support structure 540, which comprises rigid members to support the weight of projector assemblage 310. The overhead support structure 540 and/or projection assemblage 310 also support high-speed video camera 510, which in some embodiments, is utilized to track the roulette ball, as discussed more below.

The roulette system of FIG. 5 is further illustrated with roulette wheel assemblage cabinet 560 which houses roulette control unit, generally shown at 530, and supports overhead support structure 540. In one embodiment, roulette wheel assemblage cabinet 560 houses secure area 100.

Figure 6:
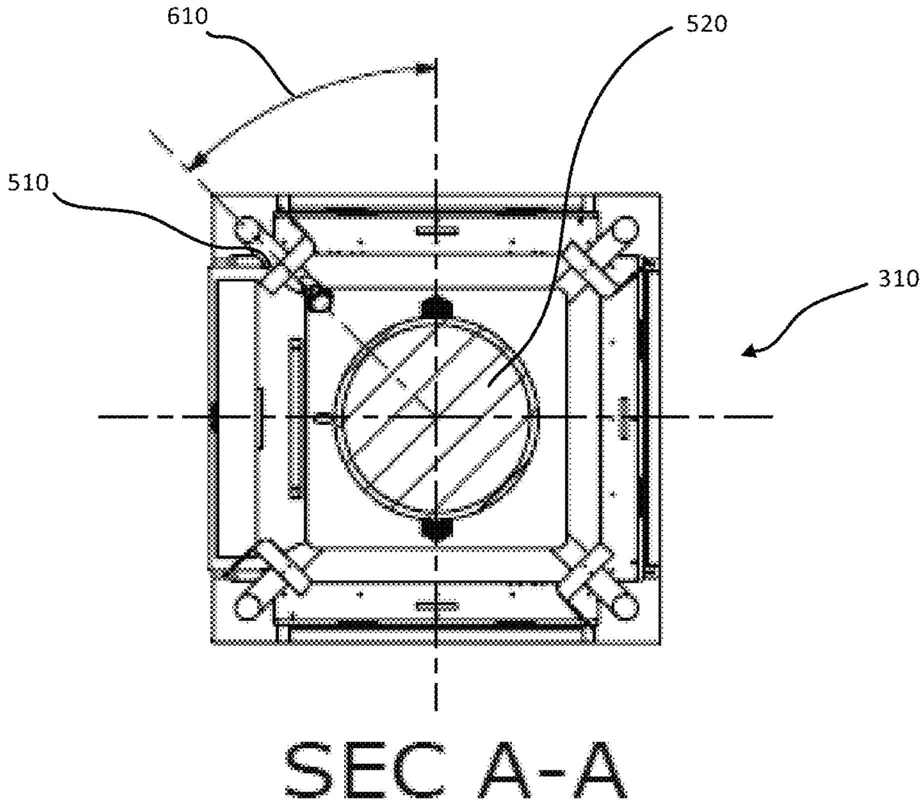
FIG. 6 is the sectional view along lines A-A of FIG. 5.

FIG. 6 is the sectional view along lines A-A, looking up at projection assemblage 310. In this example, projector 520 and high-speed camera 510 are more clearly visible. Also illustrated in FIG. 6 is horizontal camera angle 610 from the perpendicular centerlines. In one embodiment, horizontal camera angle is substantially 45° from the centerline. In this embodiment, projection assemblage 310 is substantially square in shape, and high-speed camera 510 is positioned in a corner which allows it to be partially hidden by the overhead support structure 540 illustrated in FIG. 5. Being located in this position also provides the furthest point from projector 520 while still allowing an unobstructed view of roulette wheel assemblage 320, while also not interfering with the projected display (as discussed in relation to FIG. 7). In another embodiment, the position of high-speed camera 510 is based on the position of player stations 115 around the roulette wheel assemblage 320, in order to limit any player view encumbrances. In one example, high-speed camera 510 is positioned so that on a horizontal plane, it is positioned in between two adjacent player stations 115. In another embodiment, the high-speed camera 510 is predominantly located within the projection assemblage, so that its lowest point is substantially co-planar with projector 520. While the current embodiment illustrates a projection assemblage having a substantially square shape, it should be understood that any shape or alignment may be used for the projection assemblage 310.

Figure 7:
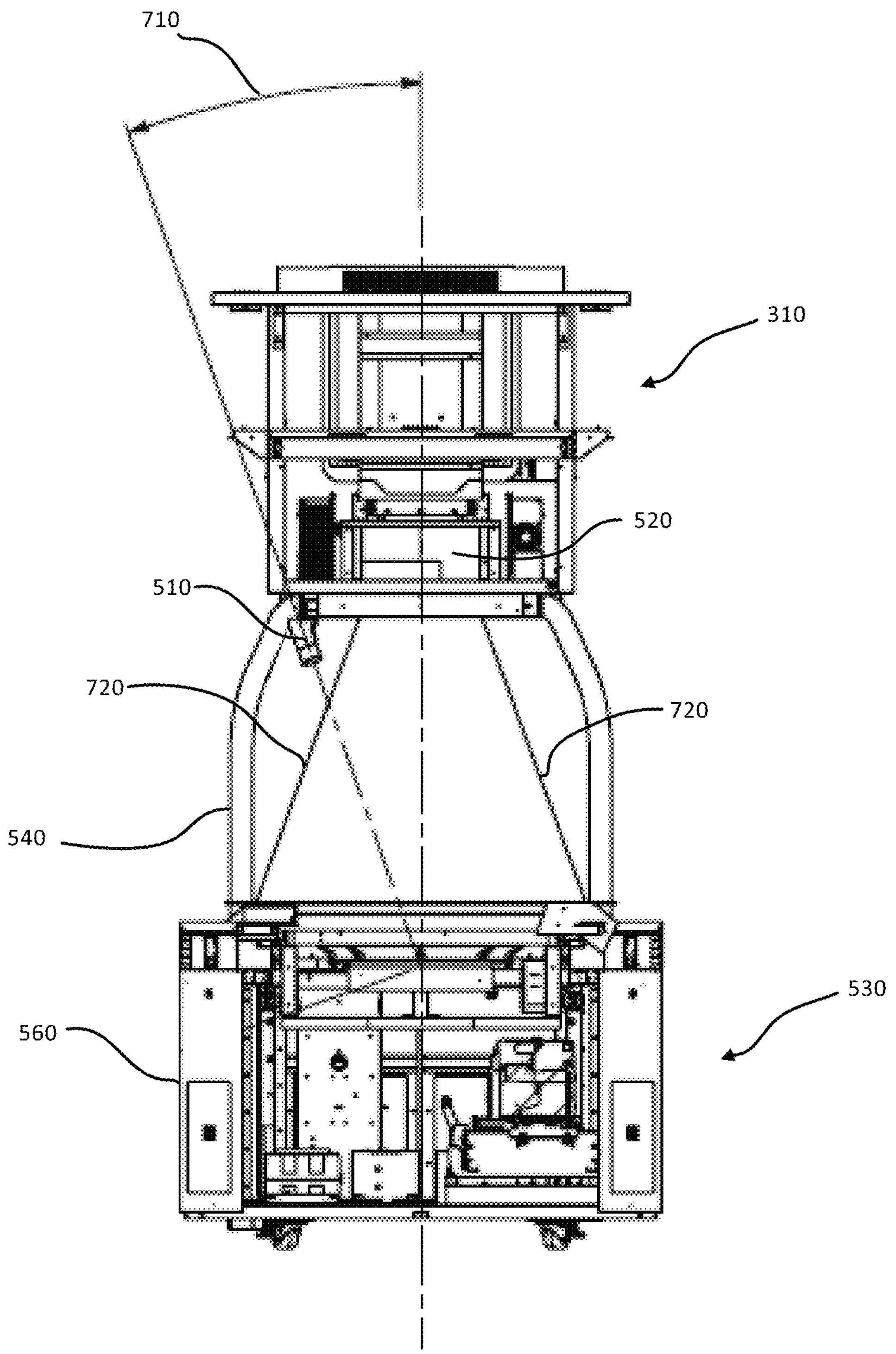
FIG. 7 is the sectional view along lines B-B of FIG. 5.

FIG. 7 is the sectional view along lines B-B. Illustrated are several of the same elements as illustrated in FIG. 5, including projection assemblage 310, high-speed camera 510, projector 520, roulette control unit shown generally at 530, overhead support structure 540, and roulette wheel assemblage cabinet 560. FIG. 7 further illustrates vertical camera angle 710 and image projection lines 720. It is contemplated that vertical camera angle 710 should allow for high-speed camera 510 to generally be centered on the axis of rotation for the roulette wheel, so that the high-speed camera can view the entire play field of the roulette wheel assemblage. In one embodiment, vertical camera angle is an angle between 15° and 25° from vertical. It is contemplated that by providing a high-speed camera 510 at such steep angles provides several benefits, including the ability to have only one high-speed camera to cover the entire play field, the reduction in parallax errors that may be associated with flatter angles, and reduced communication and processing times that may be required with more cameras and/or parallax adjustments. However, it is contemplated that an operator could utilize additional high-speed cameras 510, which may work together to determine a ball position, or work as a primary and secondary system to prevent misidentifications. It is also contemplated that in another embodiment, the use of several high-speed cameras 510 could allow for flatter angles as parallax becomes less of an issue if each camera is only responsible for a portion of the play field. In another embodiment, high-speed camera 510 is configured to also monitor the roulette wheel in order to assist in determining the rotation and/or current wheel angle of the roulette wheel. In a further embodiment, a separate high-speed camera is provided to monitor the roulette wheel.

High-speed cameras are commonly used in the tracking, identifying, and locating of moving objects, such as in automated assembly lines. In one embodiment, high-speed camera 510 comprises associated circuitry which enables the tracking of a moving roulette ball. In another embodiment, laser detection systems may be used to locate and track a moving roulette ball. In another embodiment, metal detection and/or magnetic detection devices may be used to track the moving roulette ball. In still another embodiment, radar, such as doppler radar, may be used to track a moving roulette ball. It is contemplated herein that any system that reliably tracks a moving roulette ball may be used with the roulette gaming system without departing from the spirit of the present disclosure.

The illustration of image projection lines 720 helps show the alignment of projector 520 relative to high-speed camera 510. In the present embodiment, high-speed camera 510 is positioned so that it is in a relatively close proximity to roulette wheel, at a relatively steep vertical angle, while not interfering with image projection lines 720. If high-speed camera 510 were placed lower, it could potentially cause a shadow effect on the player surface. In one embodiment, projector 520 is positioned and configured so that it can project images over the entire roulette wheel assemblage. In another embodiment, projector 520 is positioned and configured so it can only project images over the wheel itself.

In one embodiment, projector 520 displays a virtual roulette game, with a virtual roulette ball, and therefore a high-speed camera 510 is not needed. In another embodiment, projector 520 only displays visual effects on a physical wheel, and therefore a high-speed camera 510 is not needed. In still another embodiment, projector 520 displays visual effects related to the roulette ball, the position of which is determined by use of high-speed camera 510. In another embodiment, projector 520 displays visual effects for both a physical wheel and a roulette ball. In one embodiment, high-speed camera 510 is only included in those systems where tracking of a physical roulette ball is desired. In another embodiment, high-speed camera 510 is included in all systems to allow for future use of ball-tracking functionality. In still another embodiment, roulette system is configured to change from a virtual roulette system to a physical roulette system, perhaps by changing out interchangeable roulette wheel assemblages.

Figure 8:
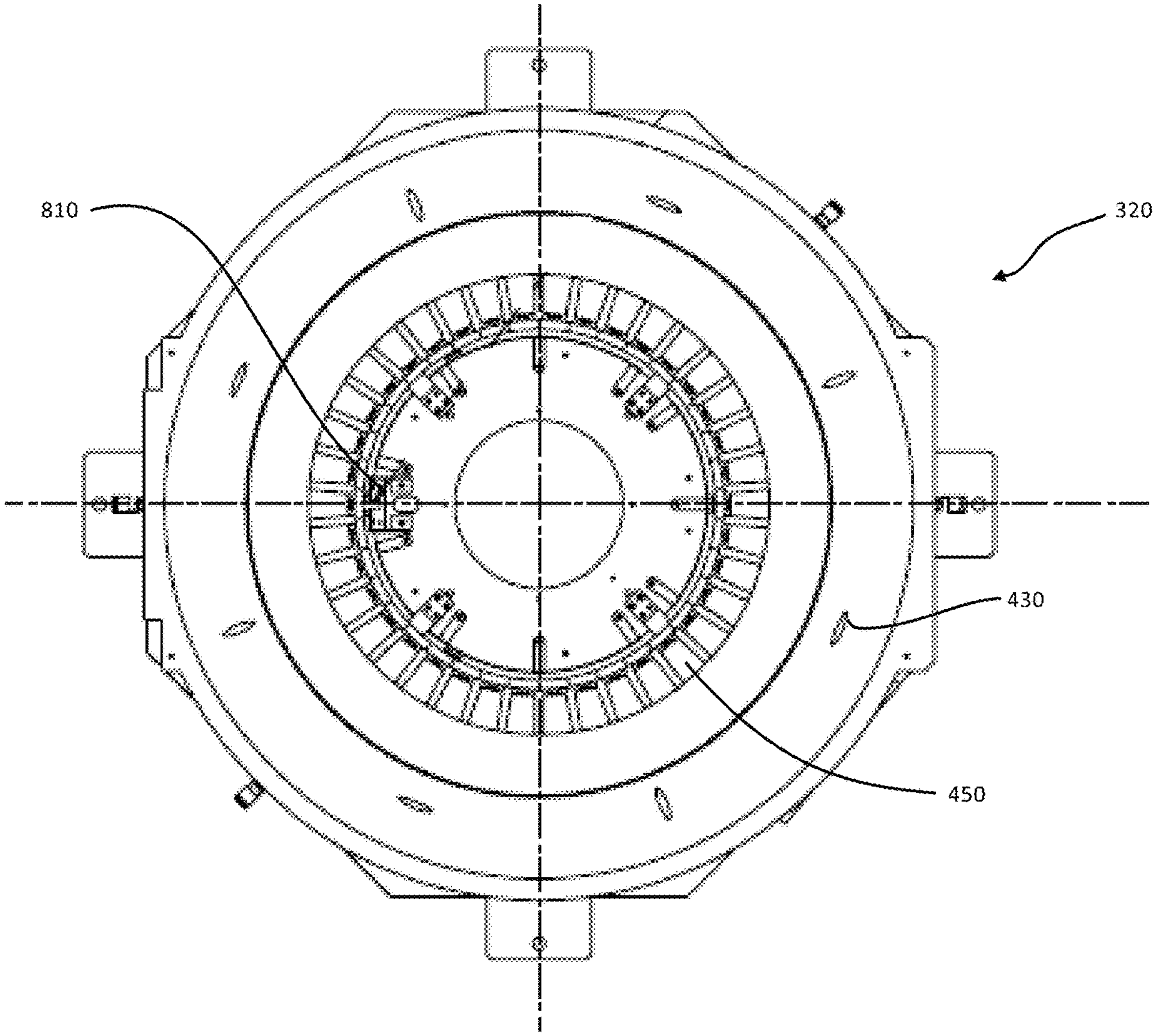
FIG. 8 is a top view of a roulette wheel assemblage with a portion of the roulette wheel removed, according to one embodiment of the present disclosure.

FIG. 8 illustrates a roulette wheel assemblage, generally shown at 320, with the center section of the roulette wheel removed so that wheel sensor 810 can be shown. In this embodiment, wheel sensor 810 is located below roulette wheel, and is configured to track the rotation and position of the roulette wheel. In one embodiment, wheel sensor 810 is an optical sensor configured to track one or more position indicators attached to the bottom or the roulette wheel. In another embodiment, position sensor 810 is a conductive sensor. In a further embodiment, position sensor 810 is an on-axis magnetic sensor. In still a further embodiment, wheel sensor 810 is an off-axis magnetic sensor. In still another embodiment, roulette positional data is communicated from a wheel motor, such as a step motor.

In accordance with one embodiment, wheel sensor 810 monitors one or more position indicators as a wheel is spinning. In such an embodiment, the wheel sensor 810 can identify the current angle of the roulette wheel, perhaps relative to a home position. For example, numerous indicators may be provided on the underside of roulette wheel, with the first one being designated as a "home" position, the next one as a "home+1" position, and so one. Then, as the indicators pass the wheel sensor 810, it can communicate the information related to which indicator passed the wheel sensor 810, which can be utilized to determine the existing position or angle of the roulette wheel.

Figure 9:
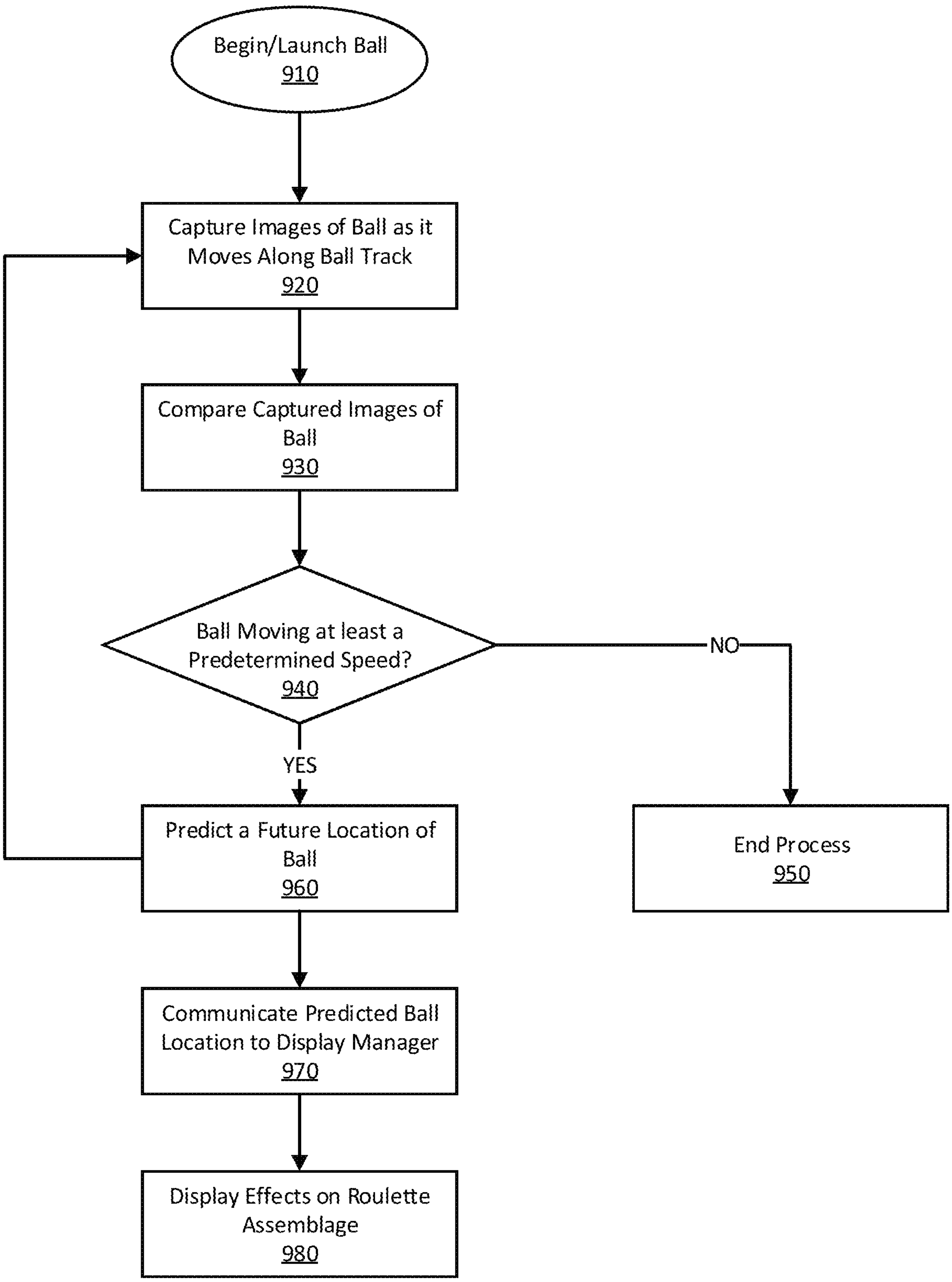
FIG. 9 is a flowchart illustrating the process for providing a dynamic visual effect for a roulette ball, according to one embodiment of the present disclosure.

FIG. 9 provides and exemplary flowchart in accordance with one embodiment where visual effects are provided for a moving roulette ball. At step 910, the process begins/ball is launched. In one embodiment, the ball is launched by a person. In another embodiment, the ball launched by mechanical means, such as a spring or a compressed air system.

At step 920, images of the moving ball are captured. In one embodiment, a single high-speed camera captures images of the ball. In another embodiment, several high-speed cameras capture images of the ball.

At step 930, captured images are compared. In one embodiment, the captured images are communicated to a graphics processing unit, as illustrated in FIG. 1, which compares a plurality of captured images to determine a velocity or speed of the roulette ball. At step 940, the system determines whether the ball is moving at least a predetermined speed. It is contemplated that if the ball is not moving at least a predetermined speed, that it may soon fall down the inclined face and strike wheel pins, therefore making it very difficult to predict future locations for. In turn, this would make it difficult to project visual effects associated with the ball. If it is determined at step 940 that the ball is not moving a predetermined speed, the process ends at step 950.

In another embodiment, the roulette system does not compare the determined speed to a predetermined speed at step 940, but rather compares a total time since the ball was launched with a predetermined time. In such an example, the operator may configure an automatic ball launcher to launch the ball with enough force that it will nearly always rotate around the roulette wheel, in the ball track, for at least a known number of seconds. In such an embodiment, the system may be configured to predict future ball locations for only that predetermined amount of time, before ending the process at step 950. In another embodiment, the system is configured to both make the determination at step 940 and compare the total time that a ball has been moving, to provide redundant safety checks that the ball is moving fast enough to remain in the ball channel.

If it is determined at step 940 that the ball is moving at least a predetermined speed, then the system predicts a future ball location at step 960. In one embodiment, such a prediction is based at least in part on the determined speed of the ball. In another embodiment, such a prediction is based at least in part on a communication lag factor, which is calculated to account for communication times between receiving the captured images of the ball at step 930 and communicating the predicted ball location at step 970. A communication lag factor, for example, could less than 0.5 seconds, or even smaller, for example 1/60 of a second. In a further embodiment, such a prediction is based at least in part of a predetermined deceleration table, which is calculated to account for typical deceleration factors for roulette balls.

From step 960, the system returns to step 920 to continue capturing images of the roulette ball, and also communicates the predicted ball location to a display manager at step 970. In the present example, the display manager then works with a graphics processing unit to display effects on the roulette assemblage at step 980.

Figure 10:
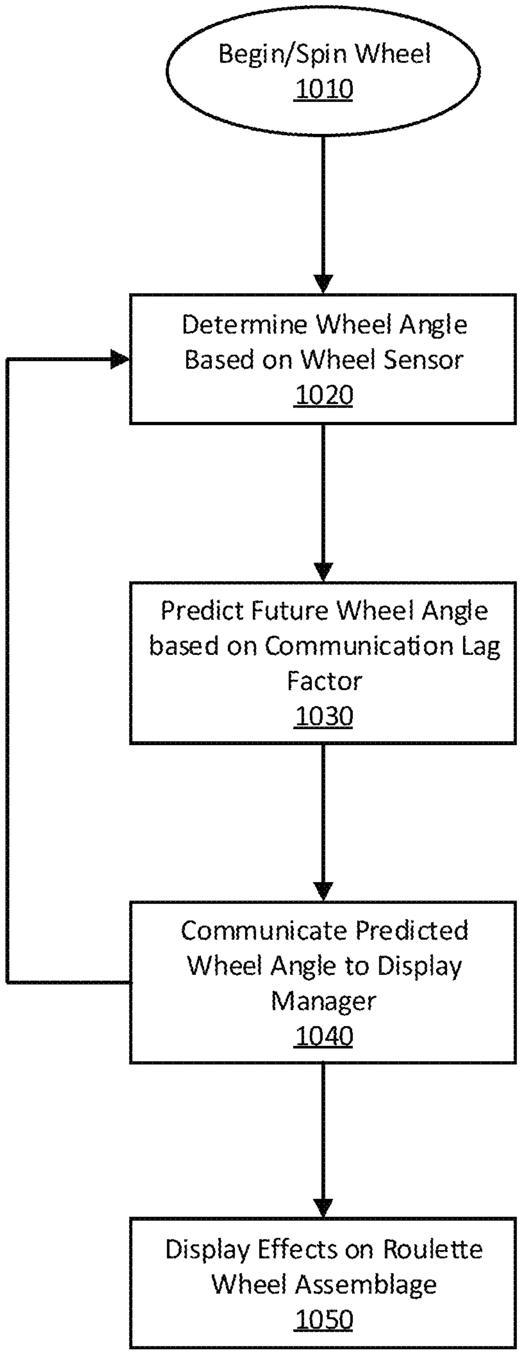
FIG. 10 is a flowchart illustrating the process for providing a dynamic visual effect for a roulette wheel, according to one embodiment of the present disclosure.

FIG. 10 provides and exemplary flowchart in accordance with one embodiment where visual effects are provided for a moving roulette wheel. At step 1010, the process begins/wheel is spun. In one embodiment, the wheel is spun by a croupier. In another embodiment, the wheel is spun by a motor. At step 1020, the wheel angle is determined based on data received from at least one wheel sensor. In another embodiment, the wheel angle is determined based on date received from a wheel motor.

At step 1030, the system predicts a future wheel angle based on a communication lag factor. such a communication lag factor may attempt to account for the communication times from determining the angle of the wheel at step 1020 and displaying the effect on the roulette wheel at step 1050. In on embodiment, such a lag factor may be less than 0.5 seconds. In another example, such a lag factor may be smaller, for example, 1/60 of a second.

At step 1040, the predicted future wheel angle is communicated to the display manager. In one embodiment, the steps of FIG. 10 are at least partially performed at graphics processing unit shown at 135 in FIG. 1.

From step 1040, the process returns to step 1020 to continue to monitor the position of the roulette wheel, and also moves to step 1050 to cause the display of effects on the roulette wheel assemblage.

Visual Effects

As discussed herein, a roulette system is configured to provide visual effects for a roulette game.

Figure 11:
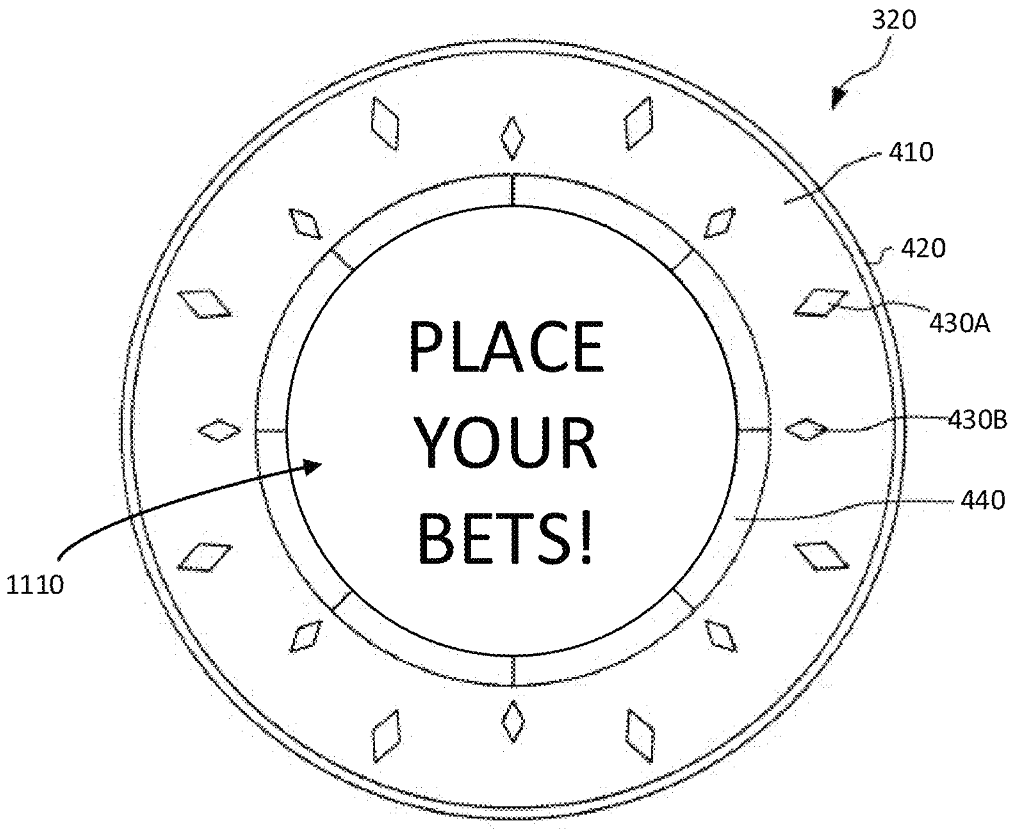
FIG. 11 is an example of visual effects displayed on a roulette wheel, according to one embodiment of the present disclosure.

FIG. 11 illustrates an example of messaging that the disclosed roulette system may provide. In this example, the message "PLACE YOUR BETS!" is provided generally at 1110 over the center of the wheel 440. In this example, the messaging 1110 is presented on the wheel in a manner where it distracts from and/or conceals the colored numbers of the underlying roulette wheel. In this example, the message 1110 is presented in a stationary position. In another example, stationary messaging could be provided at a plurality of locations and orientations around the wheel, so that it would be readable from various points around the roulette system.

In another embodiment, the roulette system is configured to display a visual effect on a moving roulette wheel. For example, the effect may comprise of words that spin with the roulette wheel. In another example, the effects may comprise visual aspects that cause the spin of the wheel to appear faster or slower than its actual speed, such as perhaps a spiral effect. In another embodiment, the visual effects may comprise a celebratory display, such as fireworks or a coin/money waterfall. It is contemplated that various visual effects are possible that would increase excitement for and/or provide information to players.

Figure 12:
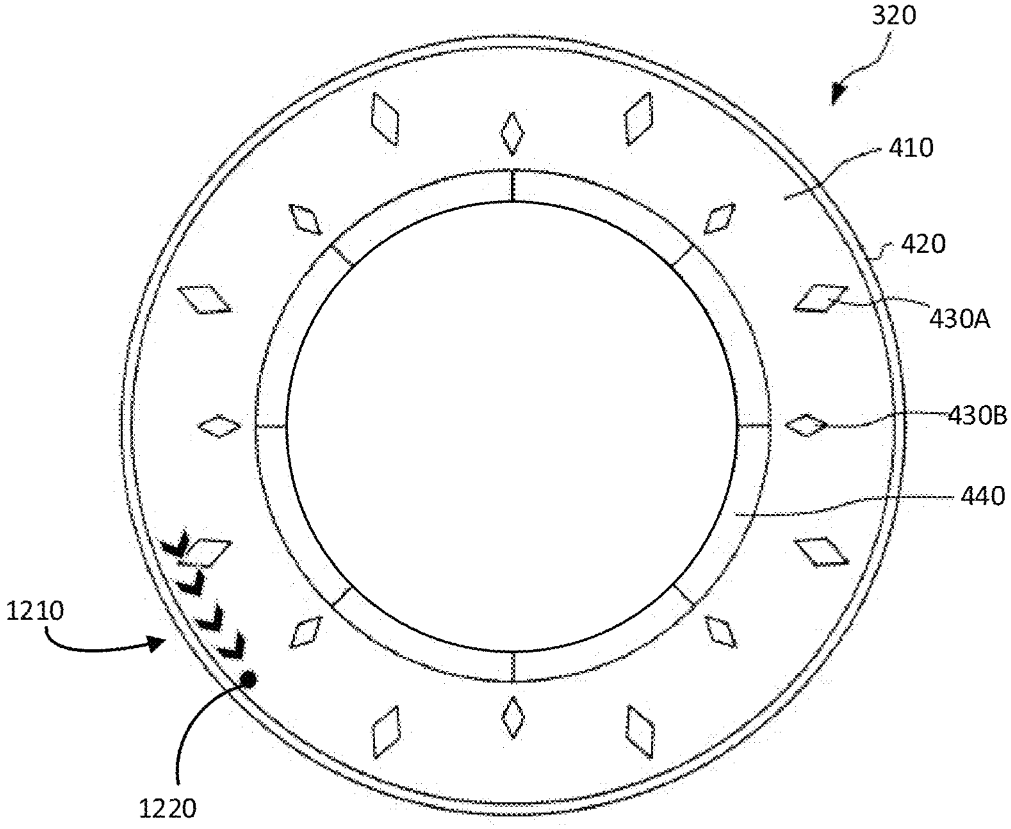
FIG. 12 is an example of visual effects associated with a roulette ball, according to one embodiment of the present disclosure.

FIG. 12 illustrates a dynamic display following a moving roulette ball 1220. In this example, it is contemplated that roulette ball 1220 is rotating in a counter-clockwise manner, and roulette ball visual effects, generally shown at 1210, illustrate a trailing dynamic visual effect. In this example, it is contemplated that the roulette ball visual effects 1210 appear to follow the moving roulette ball 1220 as it rotates around the play field. It is contemplated that such visual effects could also help players locate and track the moving ball, which sometimes may be difficult in a casino setting. In this manner, such a system could help players better appreciate the game and understand the results much quicker.

In one embodiment, the roulette system is configured to display a dynamic or moving effect following a moving roulette ball. For example, the effect may comprise of flames. Another example may be an animated object chasing the ball. In another embodiment, a visual effect may be placed in front of the moving ball to give the appearance of the ball chasing it.

It is further contemplated that the ability to provide visual effects on a roulette assemblage that is in play (e.g., has a spinning wheel and rotating ball) can allow for new game features to be offered on roulette. For example, the roulette system in accordance with the present disclosure can alter the color of a launched roulette ball to indicate that the ball is a bonus ball where all wins are modified for that spin. Another example would be to simply follow a launched ball with a color that indicates a bonus feature. In another example, roulette pockets could alternatively be highlighted during the spin to indicate a bonus pocket, and stop alternating once it is determined that the ball is about to fall down from the ball track, and that when a ball lands in a highlighted pocket, any winning award is modified.

In a further embodiment, the system is configured to display visual effects on a stopped wheel. One example of such an embodiment is to further highlight the final ball location. In another example, the system could cause the display of indicators of winning players. In such an example, the roulette gaming system is configured to both determine the final ball location, and the winning players, so such information would be communicated to the display manager, which would then cause a display of such indicators, for example arrows. In another example, as a roulette ball may come to rest prior to the roulette wheel coming to a complete stop, the roulette gaming system may cause a dynamic display of winning indicators, for example arrows or directed fireworks, which originate from the moving location of the ball pocket (that the ball has come to rest in) and end near the player station of any winning players.

Software

Reference to software in the present disclosure may encompass one or more computer programs that may encompass data, instructions, or both.

One or more tangible and non-transitory computer-readable media may store or otherwise embody software implementing particular embodiments. A tangible computer-readable medium may be any tangible medium capable of carrying, communicating, containing, holding, maintaining, propagating, retaining, storing, transmitting, transporting, or otherwise embodying software, where appropriate. A tangible computer-readable medium may be a biological, chemical, electronic, electromagnetic, infrared, magnetic, optical, quantum, or other suitable medium or a combination of two or more such media, where appropriate. Example tangible, non-transitory computer-readable media include, but are not limited to, application-specific integrated circuits (ASICs), compact discs (CDs), field-programmable gate arrays (FPGAs), floppy disks, floptical disks, heard disks, holographic storage devices, magnetic tape, caches, programmable logic devices (PLDs), random-access memory (RAM) devices, read-only memory (ROM) devices, semiconductor memory devices, and other suitable computer-readable media.

Software implementing particular embodiments may be written in any suitable programming language (which may be procedural or object oriented) or combination of programming languages, where appropriate. Any suitable type of computer system (such as a single- or multiple-processor computer system) or systems may execute software implementing particular embodiments, where appropriate.

Further examples are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present disclosure.

What is claimed is:

1. A roulette gaming system comprising:

a plurality of player stations, each configured to accept a physical item associated with a monetary wager;

a roulette wheel assemblage comprising:

a ball track;

an inclined face; and a roulette wheel comprising pockets, each of the pockets including a number;

a projection assemblage comprising a projector and a high-speed camera, the projection assemblage positioned above the roulette wheel assemblage;

a game controller;

at least one memory device that stores a plurality of instructions that, when executed by the game controller, cause the game controller to:

a) receive a communication from at least one of the plurality of player stations indicating a wager has been accepted for a play of a roulette game;

b) cause the roulette wheel to spin;

c) cause a roulette ball to be launched; and d) cause a graphical processing unit to:

i. receive information from the high-speed camera; and ii. prior to the roulette ball coming to rest in one of the pockets of the roulette wheel, cause the projector to project a dynamic visual effect on at least one of (i) the ball track of the roulette wheel assemblage, (ii) the inclined face of the roulette wheel assemblage, or (iii) the roulette wheel of the roulette wheel assemblage, the dynamic visual effect based at least in part on the received information;

e) determine a game outcome from the play of the roulette game; and f) communicate the game outcome to the at least one player station.

2. The roulette gaming system of claim 1, wherein the received information comprises location information of the launched roulette ball.

3. The roulette gaming system of claim 1, wherein the received information comprises rotation information of the spinning roulette wheel.

4. The roulette gaming system of claim 1, wherein a second visual effect is caused to be projected on the roulette wheel assemblage at a time when the roulette wheel is not spinning.

5. The roulette gaming system of claim 1, wherein the dynamic visual effect is projected on to the spinning roulette wheel.

6. The roulette gaming system of claim 1, wherein the dynamic visual effect is projected to follow the launched roulette ball.

7. The roulette gaming system of claim 1, wherein the at least one player station provides an award to a player when the determined outcome is a winning outcome.

8. The roulette gaming system of claim 1, wherein the graphical processing unit causes the dynamic visual effect to cease being projected prior to the roulette ball coming to rest in one of the pockets of the roulette wheel.

9. The roulette gaming system of claim 1, wherein a first future location and a second future location of the launched roulette ball are determined based on the received information.

10. A roulette gaming system comprising:

a plurality of player stations, each configured to accept a physical item associated with a monetary wager;

a roulette wheel assemblage comprising:

a ball track;

an inclined face;

a roulette wheel comprising pockets, each of the pockets including a number; and a wheel sensor;

a projection assemblage comprising a projector, the projection assemblage positioned above the roulette wheel assemblage;

a game controller;

at least one memory device that stores a plurality of instructions that, when executed by the game controller, cause the game controller to:

a) receive a communication from at least one of the plurality of player stations indicating a wager has been accepted for a play of a roulette game;

b) cause the roulette wheel to spin;

c) cause a roulette ball to be launched;

d) cause a graphical processing unit to:

i. receive information from the wheel sensor; and ii. prior to the roulette ball coming to rest in one of the pockets of the roulette wheel, cause the projector to project a dynamic visual effect on at least one of (i) the ball track of the roulette wheel assemblage, (ii) the inclined face of the roulette wheel assemblage, or (iii) the roulette wheel of the roulette wheel assemblage, the dynamic visual effect based at least in part on the received information;

e) determine a game outcome from the play of the roulette game; and f) communicate the game outcome to the at least one player station.

11. The roulette gaming system of claim 10, wherein the received information comprises rotation information of the spinning roulette wheel.

12. The roulette gaming system of claim 10, wherein a stationary visual effect is caused to be projected on the roulette wheel assemblage at a time when the roulette wheel is not spinning.

13. The roulette gaming system of claim 10, wherein the dynamic visual effect is projected on to the spinning roulette wheel.

14. The roulette gaming system of claim 13, wherein the dynamic visual effect is projected to follow the launched roulette ball.

15. The roulette gaming system of claim 10, wherein the at least one player station provides an award to a player when the determined outcome is a winning outcome.

16. A method of controlling a roulette gaming system, the method comprising:

receiving a communication from at least one of a plurality of player stations indicating a wager has been accepted for a play of a roulette game;

causing a roulette wheel of a roulette wheel assemblage to spin, the roulette wheel assemblage comprising a ball track and an inclined face and the roulette wheel comprising pockets, each of the pockets including a number;

causing a roulette ball to be launched;

receiving information from a high-speed camera;

based at least in part on the received information, causing a projector to project a dynamic visual effect on at least one of (i) the ball track of the roulette wheel assemblage, (ii) the inclined face of the roulette wheel assemblage, or (iii) the roulette wheel of the roulette wheel assemblage;

determining a game outcome for the play of the roulette game; and communicating the game outcome to the at least one player station.

17. The method of claim 16, wherein the received information comprises location information of the launched roulette ball.

18. The method of claim 16, wherein the received information comprises rotation information of the spinning roulette wheel.

19. The method of claim 16, wherein the dynamic visual effect is projected on to the spinning roulette wheel.

20. The method of claim 16, wherein the dynamic visual effect is projected to follow the launched roulette ball.

* * * * *